Aug. 9, 1949.   D. B. GARDINER   2,478,475
HYDRAULIC POWER BRAKING SYSTEM
Filed Feb. 15, 1946
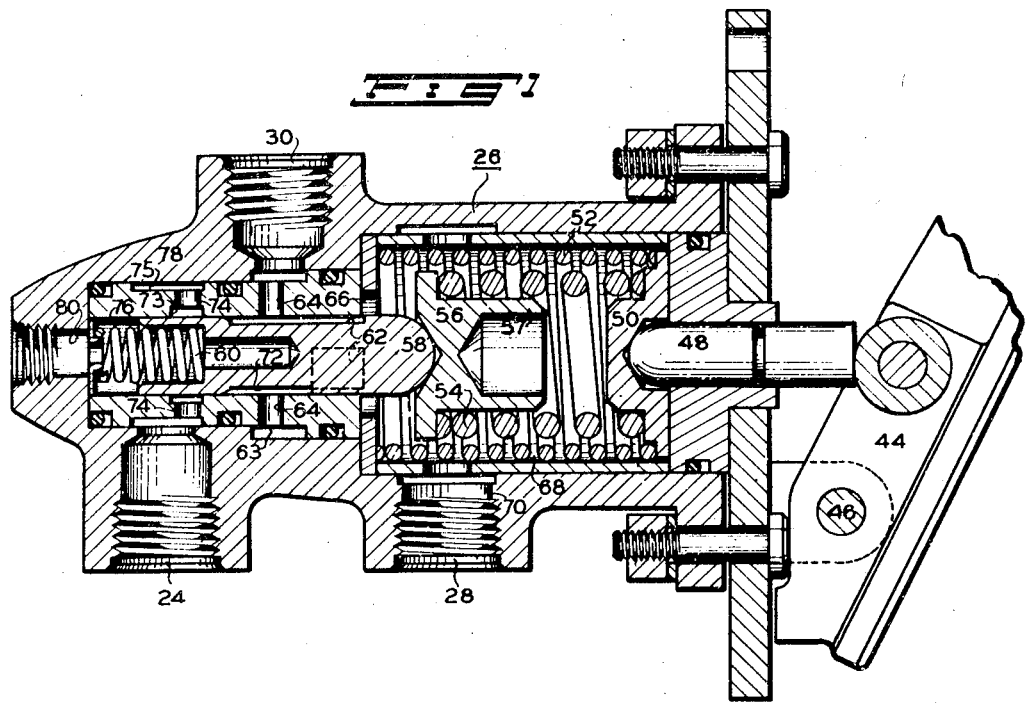
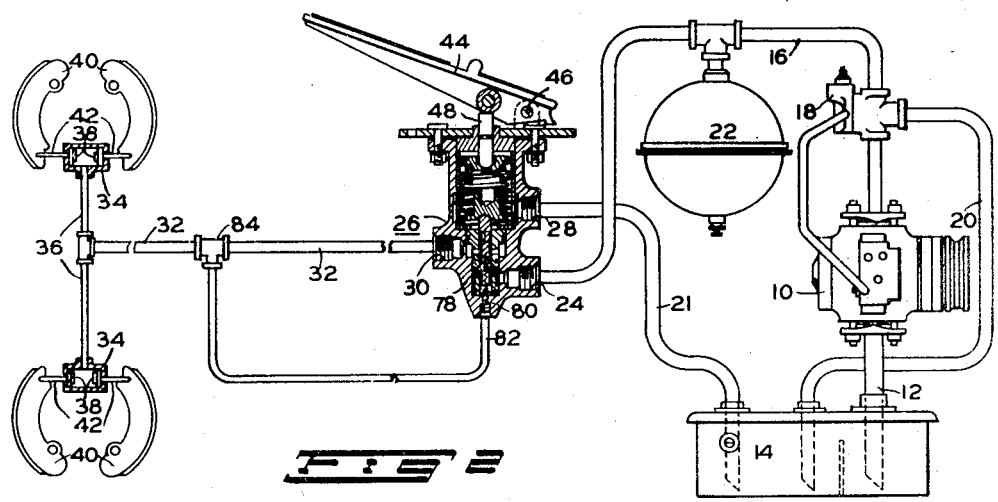
INVENTOR.
DUNCAN B. GARDINER
BY
Ralph L. Tweedale
ATTORNEY Patented Aug. 9, 1949

2,478,475

UNITED STATES PATENT OFFICE 2,478,475

HYDRAULIC POWER BRAKING SYSTEM

Duncan B. Gardiner, Detroit, Mich., assignor to Vickers Incorporated, Detroit, Mich., a corporation of Michigan Application February 15, 1946, Serial No. 647,903

8 Claims. (Cl. 188—152)

This invention relates to power transmissions, particularly to those of the type comprising two or more fluid pressure energy translating devices, one of which may function as a pump and another as a fluid motor.

The invention is more particularly concerned with power transmission systems adapted for use in applying selectively variable force to a load device such as vehicle or aircraft brakes.

In operation of such a load it is desirable that the force applied to the load be under operator control in such a manner that the manual effort applied to the controlling element determines the force applied to the load as distinct from a condition where the distance through which the controlling element is moved determines such force. In other words, it is desirable that the control has the same "feel" as occurs in a system where the manual effort is transmitted directly to the load without amplification from an outside source.

Systems heretofore proposed for providing such control have been limited in the degree to which the load at the brake sets up a reactive force opposing the brake pedal force. The element of time between the manual actuation of the brake valve and the production of a reactive stabilizing force or feel load opposing the manual force on the brake pedal is paramount to smooth efficient operation of any braking system. One of the objects of this invention is to provide a braking system wherein the brake load and the feel load or reactive force on the brake pedals are produced simultaneously, or within narrow limits of time heretofore never attained.

Another object of the present invention is to provide an improved brake system in which control of the admission of pressure fluid to the brake operating chambers is exercised normally by means of an equalizing valve and in which, under emergency conditions, full pressure from the source may be admitted directly to the operating chambers by slight additional movement of the brake pedal.

Further objects and advantages of the present invention will be apparent from the following description, reference being had to the accompanying drawing wherein a preferred form of the present invention is clearly shown.

In the drawing:

Figure 1 is a longitudinal cross section of a valve incorporating a preferred form of the present invention.

Figure 2 is a diagrammatic view of a brake control circuit incorporating the valve illustrated in Figure 1.

Referring now to Figure 2, the pump 10 may be driven by any suitable prime mover, not shown, and has a suction conduit 12 through which fluid may be withdrawn from a tank 14 and discharged to a delivery or pressure conduit 16. Incorporated in the conduit 16 is an unloading valve 18 of any suitable construction for diverting the pump delivery back to the tank 14 through conduit 20 whenever a pre-determined pressure exists in an accumulator 22 connected into the pressure conduit 16.

The pressure supply conduit 16 is connected to the pressure port 24 of the equalizing valve 26. The equalizing valve 26 is also provided with a tank port 28 connected to tank 14 through exhaust conduit 21, and with a brake operating port 30 connected by operating line 32 to brake cylinders 34. Two equivalent brake or load devices are illustrated although several may be required in a complete system. Each load device comprises pistons 38 connected to brake shoes 40 by rods 42. To operate the brakes or load devices the brake pedal 44 is depressed whereby the equalizing valve 26 ports fluid from the pressure supply port 24 to the brake operating port 30 and operating line or conduit 32.

By reference to Figure 1, the details of the equalizing valve 26 are clearly illustrated. The brake pedal 44 is pivoted to the valve frame by pin 46. Depressing the pedal 44 moves the plunger 48 and cap 50 to the left in Figure 1. This action is affected by a spring 52 which is adapted to return the plunger 48 and pedal 44 to their normal position when the manual foot pressure is released from the pedal 44. The spring 54 provides a resilient linkage between caps 50 and 56 for operating the equalizing piston valve 58.

The cap 56 may be provided with an extended portion 57 adapted to be contacted by the cap 50 after a pre-determined leftward movement thereof in Figure 1. That is, before the plunger 48 completes its full leftward travel and before the springs 52 and 54 are compressed to their solid length, the cap 50 abuts the extension 57 to give the same effect as if the spring 54 were compressed solid.

Figure 1 illustrates the equalizing valve 58 shifted to its extreme right in its normal no load position. In that position the pressure port 30 is in communication with the tank port 28 by means of annular groove 63, radial passage 64, annular groove 72, passages 62 and 66, chamber 68, and passage 70.

When the brake pedal 44 is depressed and valve 58 shifted to the left, axial groove 62 is cut off from exhaust pasage 66. The annular groove 72 which communicates with passage 62 is moved into communication with annular groove 73, radial passage 74, annular groove 75, and pressure port 24. It will be observed that annular groove 72 and axial passage 62 are in communication with radial passage 64 and operating port 30 at all times. Therefore, by depressing pedal 44 the operating port 30 and line 32 extending to the load devices, are placed in communication with pressure port 24.

As pointed out above, spring 60 will return valve 58 to its normal no load position illustrated in Figure 1. Pressure means are provided at the left end of valve 58 for shifting said valve to the right and includes stabilizing pressure chamber 76 in the valve body 78 and passage 80 communicating with the stabilizing pressure conduit 82. Conduit 82 is connected to the operating line 32 at point 84.

In operation, when the foot brake pedal 44 is depressed, the plunger 48, cap 50, spring 54, cap 56, and equalizing valve 58 are moved to the left. By shifting valve 58 to the left in Figure 1, the pressure supply conduit 16 is ported to the operating line 32 and load devices or brakes. In other words, pressure port 24 is connected to the operating port 30 through annular groove 73, radial passage 74, annular grooves 75 and 72, and passage 64. The operating pressure is then communicated by conduit 32 and branches 36 to brake cylinders 34 for operating the brake shoes 40 or load devices.

It will be noted that stabilizing pressure conduit 82 extends from the stabilizing chamber 76 to a distribution point 84 in the operating line 32. One of the objects of this invention is to provide a feel load opposing the manual pressure on pedal 44. A hydraulic stabilizing pressure is exerted in chamber 76 against the end of valve 58 which acts as a piston, transmitting a feel load or force through cap 56, spring 54, cap 50, plunger 48 to brake pedal 44. This force varies in proportion to the fluid pressure in chamber 76.

In order to understand the novel feature for stabilizing the system and producing a feel or reactive load on the brake pedal simultaneously equal to or in proportion to the load on the brake or load devices, suppose that a short stabilizing conduit merely connected the operating port 30 and passage 80 and stabilizing chamber 76. Due to the long operating line 32 extendng to the load devices, fluid pressure would reach the stabilizing chamber 76 through the short stabilizing conduit before reaching the brake cylinders 34. That condition would shift valve 58 to the right and cut off the pressure fluid supply before the brakes were loaded. The feel load opposing the manual load on the brake pedal would be exerted too early and the desire of the simultaneous feel and brake load would be lost.

On the other hand, suppose conduits 82 were extended so that the distribution point 84 was moved to a point adjacent the brake cylinders 34. In that case fluid pressure would reach the brakes and the load would be applied before any feel load could be developed in the chamber 76 for opposing the manual force upon the brake pedal 44. Under that circumstance, normal pressure on the brake pedal might produce an excessive brake load without any warning to the operator and under normal operation.

It therefore follows that an ideal condition is produced when the brake load and the stabilizing feel load occur simultaneously. To accomplish that ideal, the operating pressure in the brake cylinders 34 and the reactive stabilizing pressure in chamber 76 must be maintained equal.

The main object of this invention is to provide a braking system which will produce equal operating pressures at the brake and stabilizing cylinders not only finally, but during initial filling of the brake cylinder. However, since the final operating pressure balance is a substantially static condition, it is necessary to equalize the flow rate through the operating conduits of the system in order that a static pressure condition may be reached simultaneously at all remote or operating points.

It is therefore proposed to establish a distribution point 84 at an intermediate location between the brake valve 26 and the brake cylinders 34. From the distribution point 84, conduits or branches connect to the various brake cylinders 34 and the stabilizing chamber 76. The brake cylinders and the stabilizing chamber have definite operating displacements and therefore the rate of flow required for simultaneous operation can readily be determined.

Since the velocity flow resistance of a conduit is in direct proportion to the length of the conduit and inversely proportioned to the cross section, the size of conduit required for flow rate can be calculated. Assume any brake system wherein the locations of the brakes are fixed. By selecting any arbitrary distribution point 84 in the operating line 32, the required size of each conduit extending from that point to its respective load device or stabilizing chamber can be calculated. In other words, the size selected should provide a resistance to flow inversely proportioned to the displacement of its operating cylinder or chamber.

Simplification of the system may be accomplished by selecting one conduit size for use on all lines. Therefore, by employing conduits of equal cross section, their length can be varied inversely in proportion to required rate of flow. On the other hand, if the distribution point 84 were located at approximately a central point intermediate the load devices and stabilizing chamber, then all lengths of conduit from point 84 to the respective cylinders or chamber would be equal. In that case, the cross section of each conduit would be provided of a size in proportion to the required flow rate in that line or the displacement of its cooperating cylinder or chamber.

As explained above, the brake system can be accurately calculated to determine the exact location of the distribution point 84 in the operating line. For all practical purposes however, with standard installations it has been found that point 84 is usually located in the central portion of the operating line between the brake valve and brake cylinders. Those skilled in the art may readily calculate the approximate sizes of branch lines 36 and the relative sizes of the two sections of line 32 on either side of point 84. Experience on several brake installations has indicated that the distribution point 84 should preferably be located in the central half of the operating conduit. In other words, the distribution point 84 in conduit 32 should be located at a distance from the brake valve 26 greater than twenty-five percent of the length of conduit between valve 26 and brake cylinder 34 but less than seventy-five percent of the same distance. By establishing point 84 at an intermediate location from one-quarter to three-quarters of the distance between port 30 and cylinders 34 in the operating conduit, the desired delay in building up reactive pressure in the stabilizing chamber 76 to concur with the operating pressure in the brake cylinders, can be provided for.

It may be desirable to have the brake load lead or follow the stabilizing or feel load which can be done in the proposed system by merely shifting the position of the sampling point 84 away from or toward the equalizing valve. Other modifications may be accomplished or compensated for by adapting smaller diameters and shorter length conduits or vice versa or restrictions may be introduced in one or more lines to regulate the flow rate. However, the preferred form of my invention provides for a sampling point 84 in operating line 32 intermediate the equalizing valve 26 and brake cylinders 34 whereby the variable operating pressure at the brakes and at the stabilizing pistons are maintained substantially equal at all times.

During normal operation of the braking system, adequate braking force can be established without depressing the brake pedal fully. However, in the event of an emergency, should it be desired to lock the brakes completely, the pedal may be further depressed to positively open inlet port 74 to brake port 64. Thus, assuming that the brakes have been applied in a normal manner by a substantial depression of the brake pedal and that braking pressure has been established and the valve 58 has moved back to its neutral position in which port 64 is cut off from both pressure and exhaust connections with caps 50 and 56 having just reached abutting contact, then a further movement of the brake pedal will positively shift the valve 58 to the left to admit full pressure from accumulator 22 to the brake cylinders. This will, of course, require additional pedal effort, and the pressure built up in the brake cylinders will be felt on the brake pedal. It is impossible, however, under these conditions for the valve 58 to close unless the brake pedal is permitted to move back.

This feature provides an extra measure of safety in the brake system, particularly in systems which normally operate with braking pressures substantially lower than the normal supply pressure, and makes certain that the operator has the ability to lock the wheels in an emergency if desired. Furthermore, the provision of this feature enables the designer to so proportion the system as a whole that, during normal equalizing valve operation, the maximum braking effort is just short of that necessary to lock the brakes under average conditions, thus materially adding to tire life and ease of braking control. Without this feature, however, it is necessary for maximum safety to design the system so that, when the equalizing valve has delivered maximum equalized pressure to the operating chambers, the brakes will be locked.

For ideal operating conditions, the sampling point may be so located that the reaction time for a given pressure impulse to pass from the sampling point to the brake cylinder is just equal to the time required for the same pressure impulse to pass from the sampling point to the stabilizing cylinder. This may readily be calculated for any given system by taking into account the displacement volumes of the brake cylinders and stabilizing chamber together with length and cross-section of the various conduits. It may also be determined by trial and correction.

While the form of embodiment of the invention as herein disclosed constitutes a preferred form, it is to be understood that other forms might be adopted, all coming within the scope of the claims which follow.

What is claimed is as follows:

1. A braking system comprising a brake cylinder, a brake valve, an operating conduit, connecting the valve to the brake cylinder, and hydraulic stabilizing means including a separate conduit connecting the valve to the operating conduit at a distribution point, said distribution point being located more than twenty-five percent and less than seventy-five percent of the operating conduit distance from the brake valve to the brake cylinder.

2. A braking system comprising a brake cylinder, a brake valve, an operating conduit, connecting the valve to the brake cylinder, and hydraulic stabilizing means including a separate conduit connecting the valve to the operating conduit at a distribution point, said distribution point being located in the central half of the operating conduit at a point distant from either end more than twenty-five percent of the total length of the operating conduit between the brake cylinder and the valve.

3. A hydraulic power transmission system for applying selectively variable pressure to a fluid actuator comprising a source of fluid under pressure, an equalizing valve, a supply line and an operating line connecting the valve to the source and to the actuator, said valve being effective to supply fluid from the source to the actuator or to exhaust the actuator and including manual means for operating said valve to control the flow of hydraulic fluid to and from the actuator, and hydraulic stabilizing means including a stabilizing pressure chamber and a stabilizing conduit connecting the stabilizing chamber to a distribution point in the operating line the location of the distribution point being established in the system by balancing the fluid pressure flow from the distribution point to the stabilizing chamber and to the load device, respectively, whereby the changes in fluid operating pressure at the load device resulting from operation of the valve produce a feel load at the stabilizing chamber opposing the valve operation simultaneously with the operation of the load device.

4. A hydraulic power transmission system for applying selectively variable pressure to a fluid actuator comprising a source of fluid under pressure, an equalizing valve, a supply conduit and an operating conduit respectively connecting the valve to the source and to the actuator, said valve being effective to supply fluid from the source to the actuator or to exhaust the actuator and including manual means for operating said valve to control the flow of hydraulic fluid to and from the actuator, and hydraulic stabilizing means including a stabilizing pressure chamber and a conduit connecting the chamber to a distribution point in the operating line, the distribution point being located between the equalizing valve and the load device at a point such that the displacement of the stabilizing chamber and its conduit together are substantially equal to the displacement of the load device and its supply conduit extending from the distribution point whereby the operating fluid pressure at the load device is equal to and simultaneously produced at the stabilizing chamber.

5. A hydraulic power transmission system for applying selectively variable pressure to a fluid actuator comprising a source of fluid under pressure, an equalizing valve effective to supply fluid from the source to the actuator or to exhaust the actuator including manual means for operating said valve to control the flow of hydraulic fluid to and from the actuator, and hydraulic stabilizing means for producing a feel load opposing the manual force on the operating means and comprising a distribution point connected by a hydraulic conduit to the outlet of the equalizing valve, a stabilizing pressure chamber in the equalizing valve, and conduits respectively connecting the distribution point to the actuator and stabilizing chamber, each conduit being selected of a size to accommodate the required hydraulic flow rate for simultaneously maintaining equal operating pressures at the actuator and stabilizing chamber.

6. A hydraulic power transmission system for applying selectively variable pressure to a fluid actuator comprising a source of fluid under pressure, an equalizing valve connected to the source and to the actuator by supply and operating conduits and effective to supply fluid from the source to the actuator or to exhaust the actuator and including manual means for operating said valve to control the flow of hydraulic fluid to and from the actuator, and hydraulic stabilizing means for producing a feel load opposing the manual force on the operating means including a stabilizing chamber in the equalizing valve, a distribution point in the operating conduit, and a conduit connecting the stabilizing chamber to the distribution point, said conduit being of a predetermined cross-section and length for controlling the flow rate and producing simultaneously an operating pressure in the stabilizing chamber equal to that at the actuator.

7. A hydraulic power transmission system for applying selectively variable pressure to a fluid actuator comprising a source of fluid under pressure, an equalizing valve connected to the source for supplying fluid therefrom to the actuator or to exhaust the actuator and including manual means for operating said valve to control the flow of hydraulic fluid to and from the actuator, and hydraulic stabilizing means for producing a feel load opposing the manual force on the operating means including a stabilizing chamber in the equalizing valve, and operating conduit extending from the equalizing valve to a distribution point, and balanced pressure conduits connecting the distribution point to the actuator, and stabilizing chamber respectively, each conduit having a hydraulic flow resistance inversely proportional to the displacement of the actuator or chamber it supplies with pressure fluid.

8. A hydraulic power transmission system for applying selectively variable pressure to a fluid actuator comprising a source of fluid under pressure, an equalizing valve effective to supply fluid from the source to the actuator or to exhaust the actuator including manual means for operating said valve to control the flow of hydraulic fluid to and from the actuator, and hydraulic stabilizing means for producing a feel load opposing the manual force on the operating means, a main operating fluid conduit connecting the outlet of the equalizing valve with the actuator, and a separate conduit connecting the stabilizing chamber with the first conduit at a point such that the time lags required for a given pressure increment originating at the valve outlet to reach the actuator and to reach the stabilizing chamber are substantially equal.

DUNCAN B. GARDINER.

REFERENCES CITED

The following references are of record in the file of this patent:

UNITED STATES PATENTS

| Number | Name | Date |
|---|---|---|
| 1,895,477 | McCune | Jan. 31, 1933 |
| 2,133,275 | Andres | Oct. 18, 1938 |